United States Patent
Venkataraman et al.

(10) Patent No.: US 12,052,622 B2
(45) Date of Patent: Jul. 30, 2024

(54) REDUCING RNA UPDATE PROCEDURES AND IMPROVING RACH EFFICIENCY

(71) Applicant: APPLE INC., Cupertino, CA (US)

(72) Inventors: Vijay Venkataraman, Cupertino, CA (US); Muthukumaran Dhanapal, San Diego, CA (US); Li Su, San Diego, CA (US); Sharad Garg, Cupertino, CA (US); Syed A. Rahim, Dallas, TX (US); Sandeep K. Sunkesala, Cupertino, CA (US); Jia Tang, San Jose, CA (US); Vijay Gadde, Cupertino, CA (US); Tarakkumar G. Dhanani, San Jose, CA (US); Muhammad Saad, Sachse, TX (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/935,098

(22) Filed: Sep. 24, 2022

(65) Prior Publication Data

US 2023/0078257 A1 Mar. 16, 2023

Related U.S. Application Data

(62) Division of application No. 16/915,893, filed on Jun. 29, 2020, now Pat. No. 11,490,306.

(51) Int. Cl.
*H04W 76/11* (2018.01)
*H04B 17/318* (2015.01)
(Continued)

(52) U.S. Cl.
CPC .......... *H04W 36/08* (2013.01); *H04B 17/318* (2015.01); *H04W 52/242* (2013.01);
(Continued)

(58) Field of Classification Search
CPC . H04W 36/08; H04W 52/242; H04W 72/046; H04W 74/0833; H04W 76/11;
(Continued)

(56) References Cited

U.S. PATENT DOCUMENTS 9,125,146 B1 9/2015 Edara et al.
2014/0086208 A1 3/2014 Murray et al.
(Continued)

FOREIGN PATENT DOCUMENTS

WO 2019136664 A1 7/2019

OTHER PUBLICATIONS

U.S. Appl. No. 16/915,893, Notice of Allowance, Aug. 25, 2022, 9 pages.
(Continued)

*Primary Examiner* — Lakeram Jangbahadur
(74) *Attorney, Agent, or Firm* — Dorsey & Whitney LLP

(57) ABSTRACT

Disclosed are embodiments for reducing likelihood of selecting a cell identified by a Radio Access Network (RAN) Notification Area ID (RNA ID) that is different from that identifying a last or current serving cell so as to avoid an RNA update procedure; reducing Random Access Channel (RACH) transmissions for an RNA update procedure and a mobile originated (MO) data transmission in response to a Radio Resource Control (RRC) triggered RNA update procedure; and selecting a band or beam in a multi-band/beam cellular system that improves RACH efficiency.

12 Claims, 5 Drawing Sheets

(51) Int. Cl.
  *H04W 36/08* (2009.01)
  *H04W 52/24* (2009.01)
  *H04W 72/044* (2023.01)
  *H04W 74/0833* (2024.01)
  *H04W 76/19* (2018.01)
  *H04W 76/27* (2018.01)

(52) U.S. Cl.
  CPC ..... *H04W 72/046* (2013.01); *H04W 74/0833* (2013.01); *H04W 76/11* (2018.02); *H04W 76/19* (2018.02); *H04W 76/27* (2018.02)

(58) Field of Classification Search
  CPC ..... H04W 76/19; H04W 76/27; H04W 60/04; H04W 48/20; H04B 17/318
  See application file for complete search history.

(56) References Cited

U.S. PATENT DOCUMENTS

| | | | |
|---|---|---|---|
| 2018/0270791 A1 | 9/2018 | Park et al. | |
| 2019/0014515 A1 | 1/2019 | Zee et al. | |
| 2019/0053324 A1* | 2/2019 | Tseng | H04W 76/30 |
| 2019/0222367 A1 | 7/2019 | Tseng et al. | |
| 2019/0349825 A1 | 11/2019 | Tseng et al. | |
| 2020/0169929 A1 | 5/2020 | Yang | |
| 2020/0221363 A1 | 7/2020 | Lee et al. | |
| 2020/0260384 A1* | 8/2020 | Ryu | H04W 76/27 |
| 2020/0329455 A1 | 10/2020 | Ryu et al. | |
| 2021/0022202 A1* | 1/2021 | Kim | H04W 76/27 |
| 2021/0067945 A1 | 3/2021 | Liu et al. | |

OTHER PUBLICATIONS

U.S. Appl. No. 16/915,893, Non-Final Office Action, Dec. 15, 2021, 20 pages.
U.S. Appl. No. 16/915,893, Non-Final Office Action, Jul. 26, 2021, 19 pages.
U.S. Appl. No. 16/915,893, Final Office Action, May 2, 2022, 18 pages.
3GPP TS 38.304, "3rd Generation Partnership Project; Technical Specification Group Radio Access Network; NR-' User Equipment (UE) procedures in Idle mode and RRC Inactive state (Release 16)", V16.0.0, Mar. 1, 2020, 38 pages.
3GPP TS 38.331, "3rd Generation Partnership Project; Technical Specification Group Radio Access Network; NR; Radio Resource Control (RRC) protocol specification (Release 16)", V16.0.0, Mar. 1, 2020, 835 pages.
Huawei, Hisilicon, "Cell reselection for inactive UEs", R2-1710585 (revision of R2-1708719) 3GPP TSG-RAN WG2#99bis Meeting, Prague, Czech Republic, Agenda Item 10.4.1.7.6, Oct. 9-13, 2017, 3 pages.

* cited by examiner

REDUCING RNA UPDATE PROCEDURES AND IMPROVING RACH EFFICIENCY

TECHNICAL FIELD

This application relates generally to wireless communication systems, and more specifically to improving Random Access Channel (RACH) efficiency.

BACKGROUND INFORMATION

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi®. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
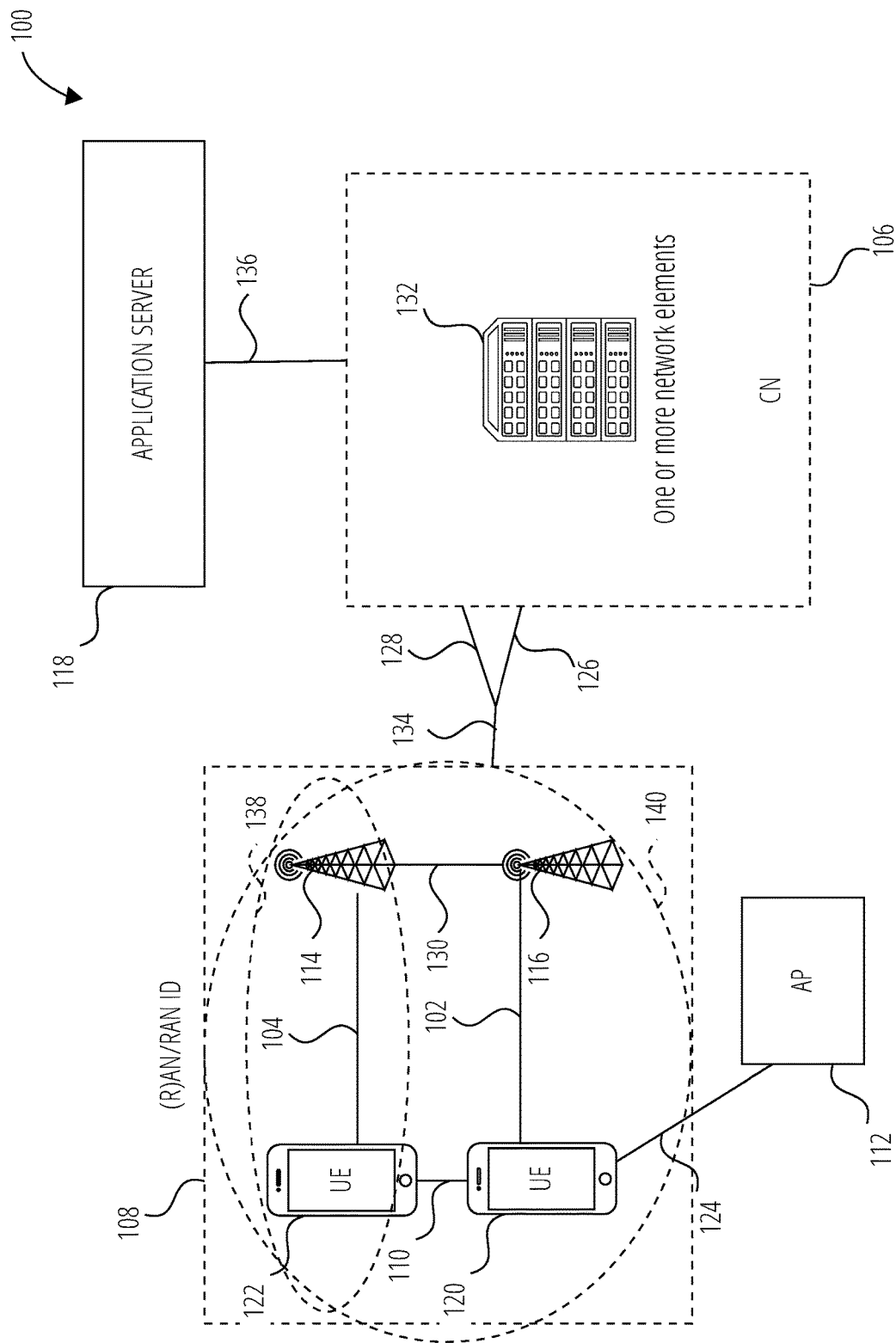
FIG. 1 is a system block diagram, according to one embodiment.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 122 and UE 120. In this example, the UE 122 and the UE 120 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 122 and/or the UE 120 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 122 and UE 120 may be configured to connect, for example, communicatively couple, with an access node or radio access node (shown as (R)AN 108). In embodiments, the (R)AN 108 may be an NG RAN or a SG RAN, an E-UTRAN, or a legacy RAN, such as a UTRAN or GERAN. As used herein, the term "NG RAN" or the like may refer to a (R)AN 108 that operates in an NR or SG system, and the term "E-UTRAN" or the like may refer to a (R)AN 108 that operates in an LTE or 4G system. The UE 122 and UE 120 utilize connections (or channels) (shown as connection 104 and connection 102, respectively), each of which comprises a physical communications interface or layer (discussed in further detail below).

In some embodiments, different RNAs are identified by a RNA ID. Each cell, specifically the gNB, broadcasts (at least one) RNA ID (e.g., in its system information; alternatively or additionally, this information can be transmitted to a UE using dedicated signaling) so that a UE knows to which RAN Notification area the cell belongs.

Cellular communication technologies employ a radio resource control (RRC) protocol to facilitate connection establishment and release, radio bearer establishment, reconfiguration, and release, and various other signaling functions supporting the air interface between a wireless device (i.e., a UE) and a cellular base station. A conventional UE may operate in one of multiple RRC states. For example, in LTE, a UE may operate in an RRC connected state or an RRC idle state. In an RRC connection state, the UE can perform continuous data transfer and handover between cells is managed by the network and access stratum context information that is retained for the UE. In an RRC idle state, the UE may operate in a more battery efficient state when not performing continuous data transfer, the UE may handle its cell reselection activities, and the network may not retain access stratum context information for the UE.

In addition to the aforementioned states, an RRC inactive state is available in NR deployments so as to support a UE operating in a relatively battery efficient manner while supporting low latency traffic (e.g., for IOT applications) since the network also retains at least some access stratum context information. Such a state also facilitates UE mobility such that a UE can move within a RAN notification area (RNA) without notifying the NR RAN. While in this state, a UE may perform cell reselection and system information acquisition for itself. At the same time, the last serving base station (e.g., gNB) may keep the UE context and the NR connection with the 5G core network (CN) associated with the UE, e.g., to facilitate easier transition back to a RRC connected state. When paging a UE in an RRC inactive mode, RNA specific parameters may be used by the RAN, for example including a UE specific DRX and UE Identity Index value (e.g., I-RNTI). A UE operating in such an RRC inactive mode may perform RNA updates periodically (e.g., based on a configured periodic RNA update timer) or when the UE moves out of its current configured RNA to a different RNA, according to some embodiments.

In this example, the connection 104 and connection 102 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 122 and UE 120 may directly exchange communication data via a ProSe interface 110. The ProSe interface 110 may alternatively be referred to as a sidelink (SL) interface 110 and may comprise one or more logical channels, including but not limited to a PSCCH, a PSSCH, a PSDCH, and a PSBCH.

The UE 120 is shown to be configured to access an AP 112 (also referred to as "WLAN node," "WLAN," "WLAN Termination," "WT" or the like) via connection 124. The connection 124 can comprise a local wireless connection, such as a connection consistent with any IEEE 802.11 protocol, wherein the AP 112 would comprise a wireless fidelity (Wi-Fi®) router. In this example, the AP 112 may be connected to the Internet without connecting to the core network of the wireless system (described in further detail below). In various embodiments, the UE 120, (R)AN 108, and AP 112 may be configured to utilize LWA operation and/or LWIP operation. The LWA operation may involve the UE 120 in RRC_CONNECTED being configured by the RAN node 114 or the RAN node 116 to utilize radio resources of LTE and WLAN. LWIP operation may involve the UE 120 using WLAN radio resources (e.g., connection 124) via IPsec protocol tunneling to authenticate and encrypt packets (e.g., IP packets) sent over the connection 124. IPsec tunneling may include encapsulating the entirety of original IP packets and adding a new packet header, thereby protecting the original header of the IP packets.

The (R)AN 108 can include one or more AN nodes, such as RAN node 114 and RAN node 116, that enable the connection 104 and connection 102. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 100 (e.g., an eNB). According to various embodiments, the RAN node 114 or RAN node 116 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 114 or RAN node 116 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 114 or RAN node 116); a MAC/PHY split wherein RRC, PDCP, RLC, and MAC layers are operated by the CRAN/vBBUP and the PHY layer is operated by individual RAN nodes (e.g., RAN node 114 or RAN node 116); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 114 or RAN node 116 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the (R)AN 108 (not shown) or by a server pool in a similar manner as the CRAN/vBBUP. Additionally, or alternatively, one or more of the RAN node 114 or RAN node 116 may be next generation eNBs (ng-eNBs), which are RAN nodes that provide E-UTRA user plane and control plane protocol terminations toward the UE 122 and UE 120, and are connected to an 5GC via an NG interface (discussed infra).

In V2X scenarios one or more of the RAN node 114 or RAN node 116 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/ software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi® hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 114 and/or the RAN node 116 can terminate the air interface protocol and can be the first point of contact for the UE 122 and UE 120. In some embodiments, the RAN node 114 and/or the RAN node 116 can fulfill various logical functions for the (R)AN 108 including, but not limited to, radio network controller (RNC) functions such as radio bearer management, uplink and downlink dynamic radio resource management and data packet scheduling, and mobility management.

In embodiments, the UE 122 and UE 120 can be configured to communicate using OFDM communication signals with each other or with the RAN node 114 and/or the RAN node 116 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 114 and/or the RAN node 116 to the UE 122 and UE 120, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 122 and UE 120 and the RAN node 114 and/or the RAN node 116 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 122 and UE 120 and the RAN node 114 or RAN node 116 may operate using LAA, eLAA, and/or feLAA mechanisms. In these implementations, the UE 122 and UE 120 and the RAN node 114 or RAN node 116 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 122 and UE 120, RAN node 114 or RAN node 116, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 122, AP 112, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (ps); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 122 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 122 and UE 120. The PDCCH carries information about the transport format and resource allocations related to the PDSCH channel, among other things. It may also inform the UE 122 and UE 120 about the transport format, resource allocation, and HARQ information related to the uplink shared channel. Typically, downlink scheduling (assigning control and shared channel resource blocks to the UE 120 within a cell) may be performed at any of the RAN node 114 or RAN node 116 based on channel quality information fed back from any of the UE 122 and UE 120. The downlink resource assignment information may be sent on the PDCCH used for (e.g., assigned to) each of the UE 122 and UE 120.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 114 or RAN node 116 may be configured to communicate with one another via interface 130. In embodiments where the system 100 is an LTE system (e.g., when CN 106 is an EPC), the interface 130 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 122 from an SeNB for user data; information of PDCP PDUs that were not delivered to a UE 122; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 106 is an 5GC), the interface 130 may be an Xn interface. The Xn interface is defined between two or more RAN nodes (e.g., two or more gNBs and the like) that connect to 5GC, between a RAN node 114 (e.g., a gNB) connecting to 5GC and an eNB, and/or between two eNBs connecting to 5GC (e.g., CN 106). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 122 in a connected mode (e.g., CM-CONNECTED) including functionality to manage the UE mobility for connected mode between one or more RAN node 114 or RAN node 116. The mobility support may include context transfer from an old (source) serving RAN node 114 to new (target) serving RAN node 116; and control of user plane tunnels between old (source) serving RAN node 114 to new (target) serving RAN node 116. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 108 is shown to be communicatively coupled to a core network-in this embodiment, CN 106. The CN 106 may comprise one or more network elements 132, which are configured to offer various data and telecommunications services to customers/subscribers (e.g., users of UE 122 and UE 120) who are connected to the CN 106 via the (R)AN 108. The components of the CN 106 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 106 may be referred to as a network slice, and a logical instantiation of a portion of the CN 106 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 118 may be an element offering applications that use IP bearer resources with the core network (e.g., UMTS PS domain, LTE PS data services, etc.). The application server 118 can also be configured to support one or more communication services (e.g., VoIP sessions, PTT sessions, group communication sessions, social networking services, etc.) for the UE 122 and UE 120 via the EPC. The application server 118 may communicate with the CN 106 through an IP communications interface 136.

In embodiments, the CN 106 may be an SGC, and the (R)AN 116 may be connected with the CN 106 via an NG interface 134. In embodiments, the NG interface 134 may be split into two parts, an NG user plane (NG-U) interface 126, which carries traffic data between the RAN node 114 or RAN node 116 and a UPF, and the S1 control plane (NG-C) interface 128, which is a signaling interface between the RAN node 114 or RAN node 116 and AMFs.

In embodiments, the CN 106 may be a SG CN, while in other embodiments, the CN 106 may be an EPC). Where CN 106 is an EPC, the (R)AN 116 may be connected with the CN 106 via an S1 interface 134. In embodiments, the S1 interface 134 may be split into two parts, an S1 user plane (S1-U) interface 126, which carries traffic data between the RAN node 114 or RAN node 116 and the S-GW, and the S1-MME interface 128, which is a signaling interface between the RAN node 114 or RAN node 116 and MMES.

As previously noted, a UE may be configured to perform an RNA update when it moves out of its current RNA. As per 3GPP specifications (TS 38.304 and TS 38.331), a conventional UE would follow a cell selection (or cell reselection) procedure while in an RRC inactive state. If the UE follows such a procedure, then it could have a high probability of entering a new cell having a new RNA, which could result in frequent RNA update procedures UE. For example, if a UE reselects to a cell in a different RNA (i.e., a different RNA ID), then the UE would perform an RNA update procedure causing higher battery drain. Such an RNA update procedure entails an RRC state transition and signaling overhead to complete the RNA update procedure. Since the UE context may be unavailable in the target cell, a new RRC connection for the UE may need to be established from RRC idle mode. This further increases power consumption and may also delay data transmission while such a procedure is in process. Moreover, a UE operating in the RRC inactive state and with high mobility may wake up at instances when the RNA changes, potentially just to perform RNA updates even though the device might not have any requirement to perform actual user data transfer. Such frequent RNA updates may incur a significant power cost to the device.

International Pub. No. WO 2019/136664 A1 of Chen et al. describes techniques to minimize unnecessary RNA update procedures. One such technique for potentially reducing the number of unnecessary RNA update procedures performed by a wireless device may include preferentially reselecting to cells within the current RNA of a wireless device when performing cell reselection, e.g., from RRC inactive mode.

This disclosure presents techniques to improve a UE's battery performance as well as maintaining service by avoiding frequent RNA updates as part of cell selection, cell reselection, and PLMN selection procedures. Accordingly, disclosed are UE-assisted enhancement to use RNA ID during these procedures.

When a UE is first powered on or the device is moved out of coverage, it tries to detect a new cell. The UE, for example, may attempt search procedures that entail a frequency scan for which there are at least two types: a Storage List Search (SLS) procedure and a Derived Band Search (DBS). An SLS procedure entails a check and scan of those frequencies stored in the UE before it has been powered on. If the UE finds no cell after performing the SLS procedure, then it will start the DBS procedure in which the UE will scan all the frequencies for an entire band.

Initially, to optionally avoid a superfluous read of System Information in connection with the techniques described later with reference to FIG. 2, whenever a UE is performing a cell selection procedure or a cell reselection procedure, it will attempt to determine the RNA ID first based on a matching value tag previously stored in an acquisition database maintained on the UE. Skilled persons will appreciate that an acquisition database may be implemented in a variety of ways and need not be limited to a relational database or the like. For example, the acquisition database may be implemented as an array or other forms of data structures suitable for storing parameters of previous RNA IDs joined or detected by the UE. Additional details on the acquisition database are provided later with reference to FIG. 5.

If a value tag is available in the acquisition database and matches the candidate ID, then the UE will reuse the RNA ID from the database. This avoids a read of System Information. If there is no match, however, then the UE will decode the System Information and determine the RNA ID.

Figure 2:
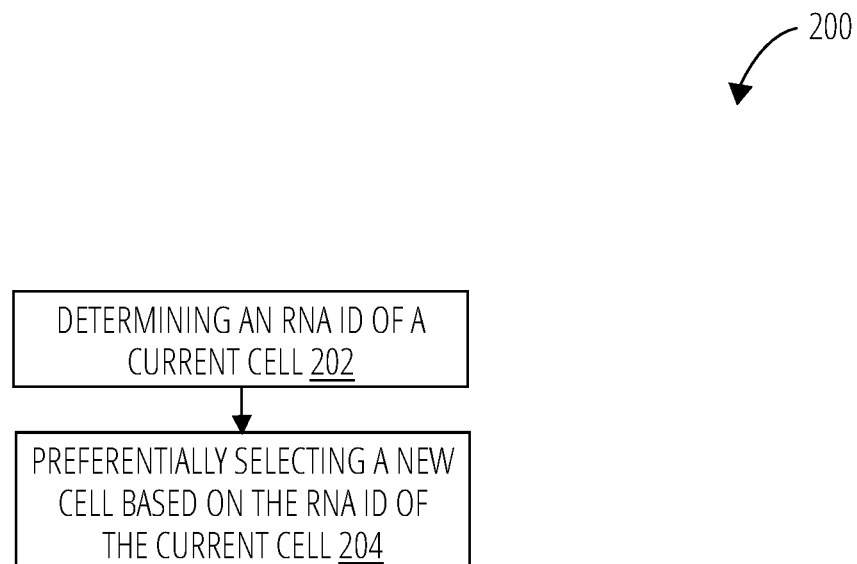
FIG. 2 is a flow chart, according to one embodiment.

FIG. 2 shows a method 200, performed by a UE that is configured to initiate a cell selection procedure or a cell reselection procedure, of reducing likelihood of selecting a cell identified by a RNA ID that is different from that identifying a previously selected cell so as to avoid an RNA update procedure. Block 202 shows that, before initiating the cell selection or reselection procedure, ran-NotificationAreaInfo received in Suspend Config in the RRC Release message is used to determine the RNA ID of the current cell. Block 204 shows preferentially selecting a new cell based on the RNA ID of the current cell.

For cell selection procedure when UE lost service and the last RRC state was RRC Inactive, the UE will determine the list of candidate cells and prioritize them in the order of RNA ID. Candidates which have the same RNA ID as that of the current cell (i.e. As parts of ran-NotificationAreaInfo) are prioritized. These candidates are searched first as part of an SLS procedure. If the thresholds and cell selection criteria pass, then UE RRC layer prioritizes camping on these cells. If these candidates fail, then UE RRC layer triggers a DBS procedure to find the list of candidates which have the same RNA ID. If the DBS procedure fails, then the UE will again do an SLS with candidates whose RNA ID are not matching from the previous step. If this SLS fails, then the DBS procedure will be triggered again (excluding candidates which were searched in the previous SLS) and candidates whose RNA ID are not matching from the previous step would be prioritized (excluding candidates which were searched in the previous SLS). In short, the aforementioned procedure may be summarized as follows: perform an SLS MATCHING RNA, followed by DBS MATCHING RNA, followed by SLS REST, and followed by DBS_REST.

For cell reselection procedure when UE is in RRC Inactive state, it will prioritize search and measurements on the neighbor cell whose RNA ID is matching with the RNA ID of the current serving cell. The priority with respect to cell search and measurements for cell reselection will be a function of the absolute priority indicated in System information (or dedicated signaling priority) as well as RNA ID of the neighbor cell, i.e., 50% priority for absolute priority and 50% priority for RNA ID. Other percentage weights and functions are also possible.

To provide an illustration, assume a serving cell has RNA ID=R1. A reselection priority level of neighbor cell is C1=7 (where priority level 0 indicates the lowest priority level and 7 indicates the highest priority level) and RNA ID of C1=R2. A reselection priority level of neighbor cell C2=6 or 7 and RNA ID of C2=R1. Accordingly, C2 is considered to be a higher priority reselection candidate even though it may have a slightly lower priority level than that of C1. This is so because C2 has the same RNA ID as that of the serving cell, which increases its prioritization.

For PLMN selection procedure triggered when in RRC Inactive state, non-access stratum (NAS) layer in UE will initiate performing foreground and/or background PLMN selection on the current cell/RNA s PLMN. If that PLMN selection procedure does not yield any results, it should try PLMN selection on other PLMNs.

In some embodiments, a UE combines an RNA update as well as a mobile originated (MO) data transfer. For example, a current serving cell may have a bad Reference Signal Receive Power (RSRP) level. In a cell reselection procedure, a different cell is found to belong to a different RNA ID yet has a very good RSRP level. When an AP (e.g., iOS or Android host application) triggers a mobile originated (MO) data transfer for background data (i.e., data that is updated without user involvement), and that update can be delayed without a detriment to the user experience (e.g., slightly delayed stock price information for updating an app running in the background), the UE will pend the MO data transfer procedure for a short duration and perform a cell reselection procedure. The UE will then trigger a unified RACH procedure for both RNA update as well as MO data transfer. This way, the UE ends up moving to a new cell with a higher RSRP as well as avoids unnecessary RACH for RNA update procedure.

In another embodiment, when UE 122 transitions from RRC Connected mode to RRC Inactive mode, UE 122 might transition back to RRC_Connected state due to sending or reception of data. In typical deployments, when in RRC Connected mode, network steers the UE to a capacity (high throughput) cell, and once the UE is in RRC IDLE state, network steers the UE to a coverage cell. When UE 122 transitions back to RRC_Connected, it is preferable for UE 122 to retain service in a capacity (high throughput) cell 138 (FIG. 1), which offers better throughput characteristics when compared to a coverage cell 140. However it is also desired that the UE avoid frequent transitions between capacity and coverage cells, specially when transitioning between RRC Connected and RRC Inactive state. Accordingly, before transitioning either to RRC_Inactive or back to RRC_Connected, then UE 122 will reduce the SIB priority of its coverage cell 140 such that UE 122 does not transition from capacity cell 138 to coverage cell 140.

The aforementioned UE-implemented adjustment of the SIB information is intended to address the fact that the network is unable different broadcast SIB priority in Idle vs Inactive state. Moreover, while in Idle state, the network and the UE would prefer the UE to be in coverage cell. And while in Inactive state, the network and the UE would prefer the UE to be in capacity cell so that a coverage-to-capacity cell handover is not needed if UE moves to connected state immediately.

As a 3GPP standards enhancement embodiment, a gNB may also explicitly indicate SIB reselection priority for neighbor cells as follows: reselection priority for RRC idle and reselection priority for RRC inactive.

This disclosure also describes mobile-assisted mechanisms to avoid power drain during simultaneous data and signaling. As per 3GPP TS 38.331, a desired behavior of a UE is ambiguous if the UE simultaneously triggers a Resume Request from RRC layer due to RNA update (cell change as well as periodic RNA timer expiry) as well a Resume Request from NAS layer (for MO data). The current specification does not clarify what should be the Resume request cause for this scenario and it is left to a UE's implementation. Performing two separate Random Access Channel (RACH) procedure (first for RNA update and second for MO data) would be inefficient. Hence, this disclosure describes optimizations to avoid power drain in such scenarios of simultaneous data and signaling procedure.

Figure 3:
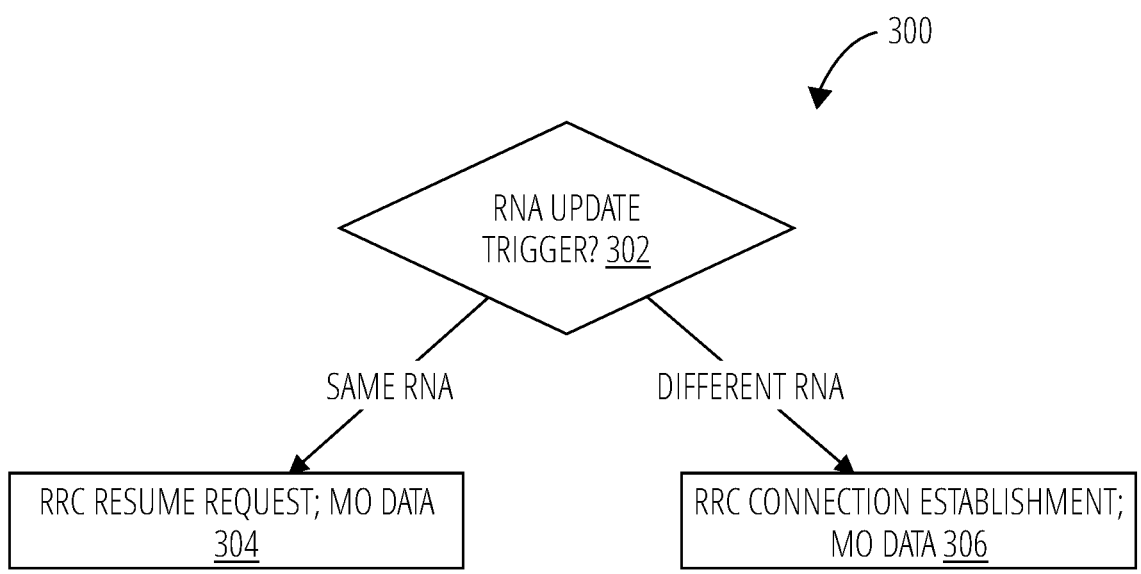
FIG. 3 is a flow chart, according to one embodiment.

FIG. 3 shows a method 300 performed by a UE when RRC triggers an RNA procedure. Decision block 302 corresponds to how the RNA procedure was triggered.

Block 304 corresponds to the cases in which the RNA procedure was triggered (1) not due to cell change and due to the periodic RNA timer expiry or (2) the cell changes but belongs to the same RNA and then the RNA timer expires. At block 304, the UE would perform the following procedure. If its AP (e.g., iOS or Android host application) is ready to trigger a mobile originated (MO) data transfer in the next X duration (X is configurable time duration and the default value is 0, i.e., data transfer is immediate), then, instead of two separate RACH procedures, i.e., a first with RNA update and a second with MO data, the UE will trigger a Resume Request procedure with reason being mobile originated (MO) Data. It will then transition to RRC Connected state.

If the AP ended up coalescing/buffering low priority data or background in its queue, and if the RNA timer at the UE or network is about to expire, then the Baseband chip (BB) in the UE will request the AP to initiate the MO data procedure (if cell did not change or the new cell belongs to the same RNA) such that the number of RRC Connection/RACH procedures are minimized to one instead of two.

Block 306 corresponds to the case in which the RNA procedure was triggered due to a cell change which belongs to a different RNA. In such cases, there is a chance that the new RNA does not recognize the UE, and network may reject the resume request. If the AP is about to trigger data transfer in the next X duration (X is configurable time duration and the default value is 0, i.e., data transfer is immediate), then, instead of two separate RACH procedures, i.e., a first with RNA update and a second with MO Data, the UE will locally transition to RRC IDLE mode, trigger a RRC Connection establishment procedure (instead of a RRC Resume Request procedure) and fill the Connection establishment cause as MO data. BB requests AP to immediately trigger a MO data procedure (explained above) so that it can be combined with the RNA update triggered Connection establishment procedure.

In current cellular environments, it is often when UE is operating under RF scenarios where multiple bands and/or multiple beams (or simply, bands/beams) are available. (Thus, when UE tries to acquire the system, it is very important to choose a band/beam which has better probability of success. As per the current 3GPP standard, the UE attempt to choose a band/beam by measurement of only the downlink (DL) signal quality. This means that transmission efficiency of the UE is not considered. Due to the aforementioned deficiency, there can be scenarios in which a UE could choose band/beams having superior downlink signal, but later fail or utilize more transmit power while doing transmission operations such as RACH.

Figure 4A:
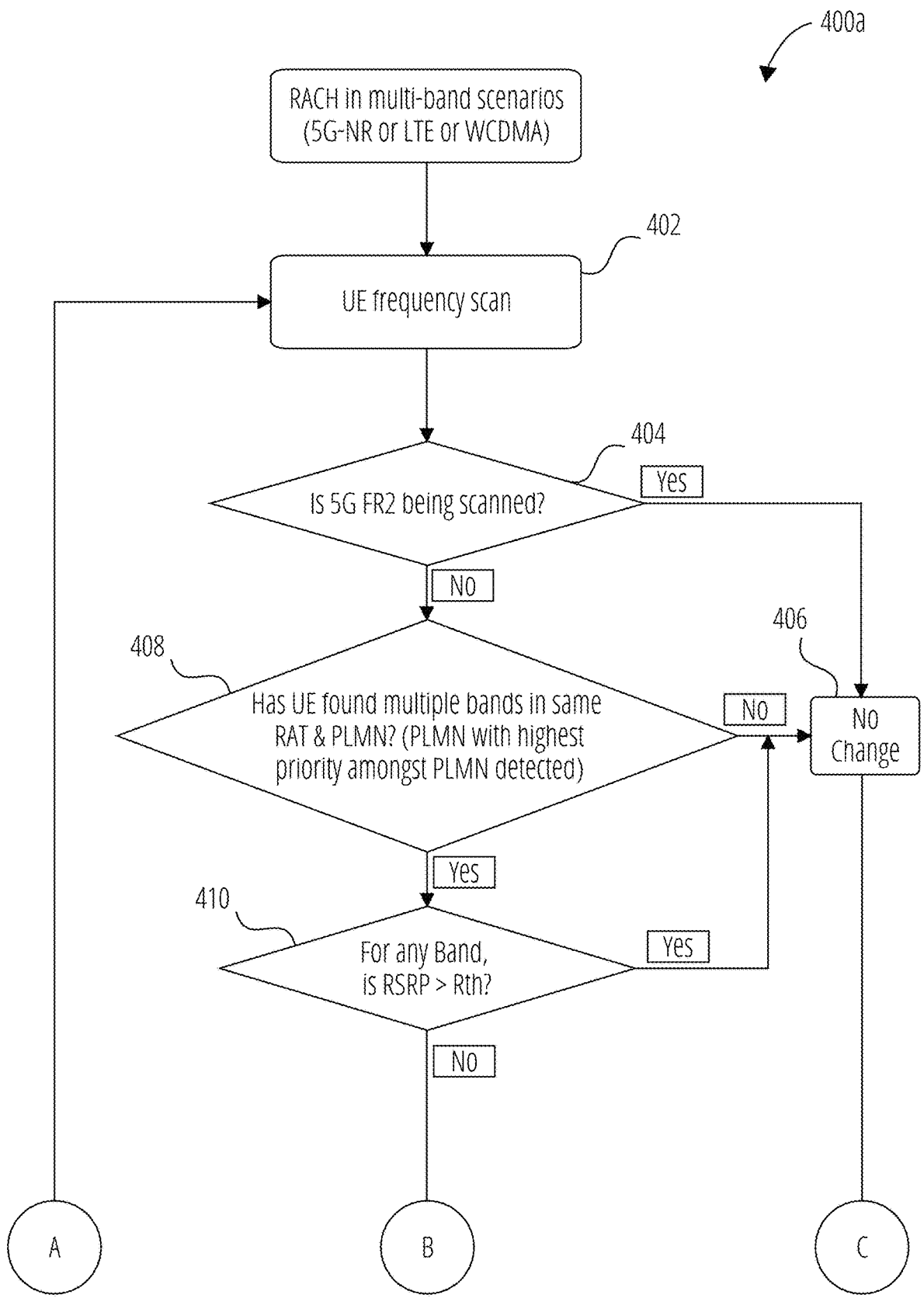
FIG. 4A is an upper portion of a flow chart, according to one embodiment.
Figure 4B:
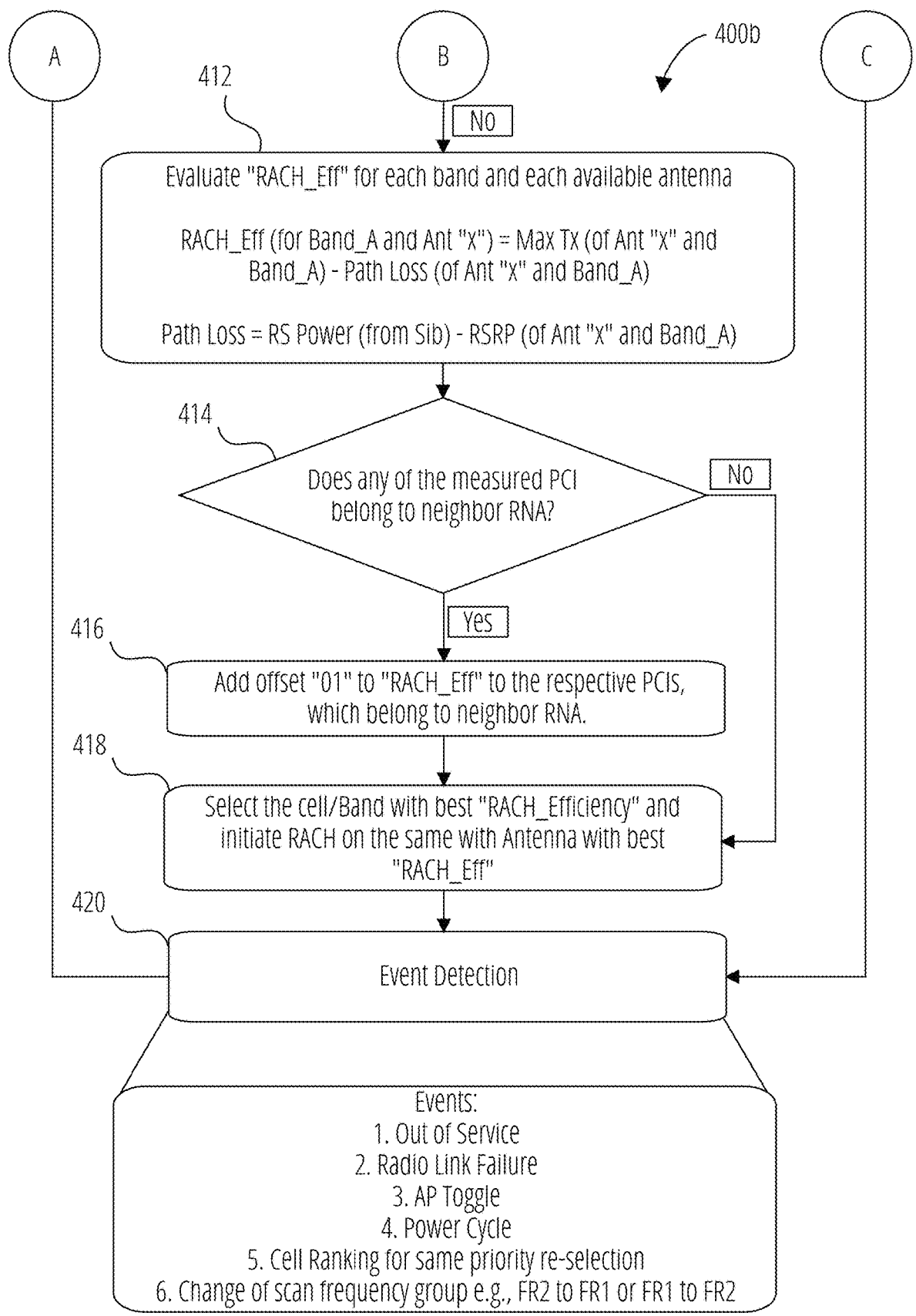
FIG. 4B is a lower portion of the flow chart of FIG. 4A, according to one embodiment.

To address this issue, a UE may consider, along with DL signal strength, various parameters related to the uplink (UL) such as Tx efficiency, DL path-loss, Max Tx power, Total Radiated Power (TRP), and the like. For example, FIG. 4A and FIG. 4B show and example method (including a part 400a of FIG. 4A and a part 400b of FIG. 4B) for optimizing the system such that a UE has improved RACH efficiency along with Rx efficiency. In addition to its applicability to 5G-NR systems, this technique can also help to improve RACH efficiency for LTE and other RATs.

At block 402, a UE performs a frequency scan. Block 404 shows that, if the scan is for 5G FR2, then the process proceeds to block 406 and there is no change in the RACH procedure (see e.g., block 420 of FIG. 4B). Additional details following block 406 are described later with reference to FIG. 4B.

If the scan is not for 5G FR2, then the method proceeds to block 408 to determine whether the UE has found multiple bands in the same RAT and PLMN having the highest priority amongst those detected. If not, then the process again proceeds to block 406 and there is no change in the RACH procedure. If so, however, then the process proceeds to block 410.

At block 410, for any of the multiple bands found in block 408, the RSRP is compared to a threshold Rth. An example Rth is −100 dBm. In one implementation, this is a configurable value, and based on field trials, this threshold can be fine-tuned. Thus, it should not be considered fixed across all bands, but rather mat be fixed per band in some examples. If one of the bands has an RSRP above Rth, then the process proceeds to block 406. If none of the bands has an RSRP above Rth, then the process proceeds to a block 412 (FIG. 4B).

At block 412, RACH_Eff is evaluated for each band measured by each available antenna. As shown in FIG. 4B, RACH_Eff is a function of Max Tx minus Path Loss. Path Loss is a function of RS Power (indicated in the SIB) minus RSRP. The process proceeds to block 414.

At block 414, it is determined whether any of the measured Physical Cell Identifiers (PCI) belong to neighbor RNA. PCIs belonging to the current RNA is/are indicated by the network as part of below Information Element.

```
RAN-NotificationAreaInfo ::= CHOICE {
    cellList PLMN-RAN-AreaCellList,
    ran-AreaConfigList PLMN-RAN-AreaConfigList.
    ...
}
```

If yes, then the process proceeds to block 416 at which an offset "01" is added to the RACH_Eff of the PCIs that belong to a neighbor cell. This essentially prioritizes the existing RNA and is an optional step for non-5G networks. It is skipped entirely if no PCIs belong to a neighbor RNA. The process proceeds to block 418.

At block 418, the cell/band with the best RACH Eff is selected. A RACH is initiated with the antenna having the best RACH_Eff.

Finally, at block 420, the UE awaits event detection. Events include: out of service, radio link failure, airplane mode toggle, power cycle, cell ranking for same priority reselection, and change of scan frequency group, e.g., FR2 to FR1 or vice versa. In response to an event being detected, the process returns to block 402 (FIG. 4A).

Experiments have shown that, by considering Max Tx in choosing a band/beam, the likelihood of a successful RACH improves. In one experiment, Max Tx was equal to 14 dBm and the RACH attempt failed even after passing cell selection criteria. In contrast, when Max Tx equaled 19 dBm, the RACH attempt was successful. In both attempts the SRxlev (Serving Rx level) was exactly the same value the RSRP (sum) was about 121 dBM.

Figure 5:
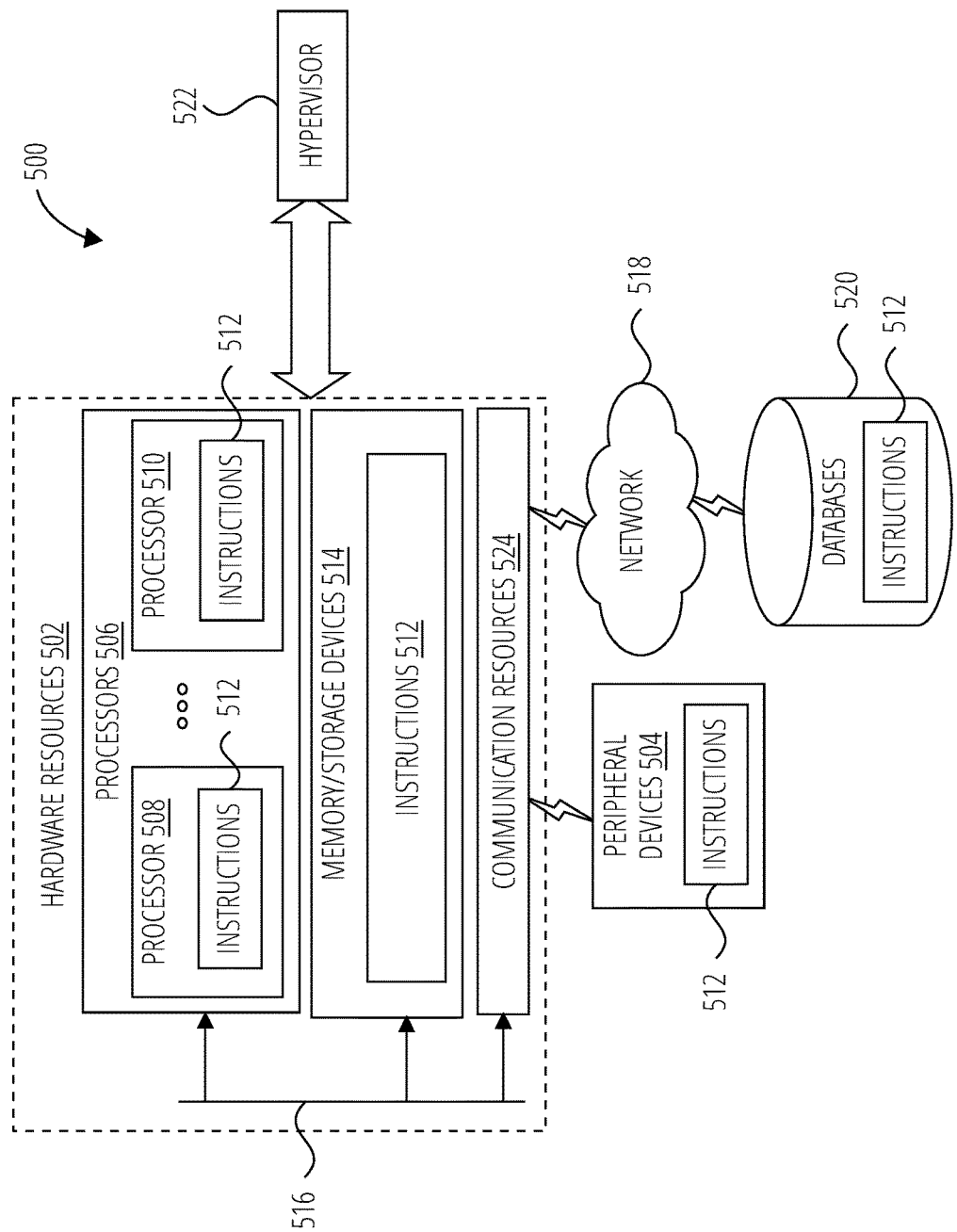
FIG. 5 is a block diagram of a computing device, according to one embodiment.

FIG. 5 is a block diagram illustrating components 500, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 502 including one or more processors 506 (or processor cores), one or more memory/storage devices 514, and one or more communication resources 524, each of which may be communicatively coupled via a bus 516. For embodiments where node virtualization (e.g., NFV) is utilized, a hypervisor 522 may be executed to provide an execution environment for one or more network slices/sub-slices to utilize the hardware resources 502.

The processors 506 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 508 and a processor 510.

The memory/storage devices 514 may include main memory, disk storage, or any suitable combination thereof. The memory/storage devices 514 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 524 may include interconnection or network interface components or other suitable devices to communicate with one or more peripheral devices 504 or one or more databases 520 via a network 518. For example, the communication resources 524 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 512 may comprise software, a program, an application, an applet, an app, or other executable code for causing at least any of the processors 506 to perform any one or more of the methodologies discussed herein. The instructions 512 may reside, completely or partially, within at least one of the processors 506 (e.g., within the processor's cache memory), the memory/storage devices 514, or any suitable combination thereof. Furthermore, any portion of the instructions 512 may be transferred to the hardware resources 502 from any combination of the peripheral devices 504 or the databases 520. Accordingly, the memory of the processors 506, the memory/storage devices 514, the peripheral devices 504, and the databases 520 are examples of computer-readable and machine-readable media.

Skilled persons will appreciate that databases 520 may reside in memory/storage devices 514. For example, the acquisition database described previously may be implemented in memory of a UE and store information of cells detected in connection with a cell selection procedure.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method, performed by a User Equipment (UE) configured to initiate a cell selection procedure or a cell reselection procedure, of reducing likelihood of selecting a cell identified by a Radio Access Network (RAN) Notification Area ID (RNA ID) that is different from that identifying a last or current serving cell so as to avoid an RNA update procedure, the method comprising: before initiating the cell selection procedure or the cell reselection procedure, determining an RNA ID of the last or current serving cell; and preferentially selecting a new cell based on the RNA ID of the last or current serving cell.

Example 2 is the method of Example 1 further comprising: attempting to obtain an RNA ID of the new cell based on its associated system information value tag matching that stored in an acquisition database maintained by the UE; and in response to determining a match, reusing the RNA ID retrieved from database so as to avoid a decode of System Information from the new cell.

Example 3 is the method of Example I in which the determining the RNA ID comprises obtaining the RNA ID from information stored in an acquisition database maintained by the UE.

Example 4 is the method of Example 1 in which the preferentially selecting comprises performing a Storage List Search (SLS) procedure on a list of candidates which belong to the same RAN Notification Area as the last or current serving cell.

Example 5 is the method of Example 4 in which the preferentially selecting comprises, in response to the SLS procedure being unsuccessful, performing a Derived Band Search (DBS) procedure on the list of candidates.

Example 6 is the method of Example 5 in which the preferentially selecting comprises, in response to the DBS procedure being unsuccessful, performing a supplemental SLS procedure on another list of candidates which may not belong to the same RAN Notification Area as the last or current serving cell.

Example 7 is the method of Example 6 in which the preferentially selecting comprises, in response to the supplemental SLS procedure being unsuccessful, performing a supplemental DBS procedure on at least a portion of the list of candidates having an RNA ID that does not match that of the last or current serving cell.

Example 8 is the method of Example 7 in which the at least a portion of the list of candidates excludes candidates previously searched in the SLS procedure.

Example 9 is the method of Example 1 in which the preferentially selecting comprises determining a priority as a function of RNA ID and an absolute priority indicated in System Information or dedicated signaling priority.

Example 10 is the method of Example 1 further comprising triggering a unified Random Access Channel (RACH) procedure for a mobile originated data transfer and an RNA update.

Example 11 is the method of Example 1 further comprising reducing a System Information Block (SIB) priority of a coverage cell in RRC Inactive state before transitioning to an RRC_Connected state in a capacity cell.

Example 12 is the method of Example 1, further comprising receiving from a gNB a System Information Block (SIB) reselection priority for neighbor cells indicating reselection priority for RRC idle and reselection priority for RRC inactive.

Example 13 is a method, performed by a User Equipment (UE) in a Radio Resource Control (RRC) Inactive state of reducing Random Access Channel (RACH) transmissions for a Radio Access Network (RAN) Notification Area (RNA) update procedure and a mobile originated (MO) data transmission in response to an RRC triggered RNA update procedure, the method comprising: in response to the RNA update procedure being triggered due to a cell change to an RNA that is different from that of a last or current serving cell, locally transitioning to RRC IDLE state and triggering an RRC connection establishment procedure indicating a connection establishment cause as MO data; and in response to the RNA update procedure being triggered due to an RNA timer expiry of a serving cell or another cell in the same RNA as the last or current serving cell, triggering an RRC resume request procedure with its cause being MO data.

Example 14 is the method of Example 13, further comprising determining whether the MO data transmission will occur within a predetermined period Example 15 is the method of Example 14, in which the predetermined period is configurable.

Example 16 is the method of Example 14, further comprising triggering the resume request procedure if the data transfer will occur within the predetermined period.

Example 17 is the method of Example 14, further comprising triggering the RRC connection establishment procedure if the data transfer will occur within the predetermined period.

Example 18 is the method of Example 13, further comprising receiving a request to initiate the MO data transmission and combining in a single RACH the MO data transmission and the RNA update procedure Example 19 is a method, performed by a User Equipment, of selecting a band or beam in a cellular system that improves Random Access Channel (RACH) efficiency, the method comprising: determining for each member of a set of candidate band and/or beam a RACH efficiency parameter as a function of Max Tx and path loss; and selecting from the set a band or beam having a value of the RACH efficiency parameter exceeding that of any other member of the set.

Example 20 is the method of Example 19, in which the Max Tx parameter is received in a System Information Block (SIB).

Example 21 is the method of Example 19, further comprising determining the path loss based on reference signal power information received in a System Information Block (SIB).

Example 22 is the method of Example 19, further comprising determining the path loss based on Reference Signal Receive Power (RSRP) level.

Example 23 is the method of Example 19, further comprising initiating the RACH on an antenna associated with the highest RACH efficiency parameter.

Example 24 is the method of Example 19, further comprising modifying a RACH efficiency parameter for a member of the set associated with a Radio Access Network (RAN) Notification Area (RNA) that is different from a serving cell of the UE.

Example 25 is a non-transitory machine-readable storage medium, the machine-readable storage medium including instructions that when executed by a processor of a User Equipment (UE), cause the UE to reduce the likelihood of selecting a cell identified by a Radio Access Network (RAN) Notification Area ID (RNA ID) that is different from that identifying a last or current serving cell so as to avoid an RNA update procedure in a cell selection procedure or a cell reselection procedure by configuring the UE to:

before initiate the cell selection procedure or the cell reselection procedure, determine an RNA ID of the last or current serving cell; and preferentially select a new cell based on the RNA ID of the last or current serving cell.

Example 26 is the machine-readable storage medium of Example 25 in which the instructions further configure the UE to:

attempt to obtain an RNA ID of the new cell based on its associated system information value tag matching that stored in an acquisition database maintained by the UE; and in response to determining a match, reuse the RNA ID retrieved from database so as to avoid a decode of System Information from the new cell.

Example 27 is the machine-readable storage medium of Example 25 in which the determining the RNA ID comprises obtain the RNA ID from information stored in an acquisition database maintained by the UE.

Example 28 is the machine-readable storage medium of Example 25 in which the preferentially selecting comprises performing a Storage List Search (SLS) procedure on a list of candidates which belong to the same RAN Notification Area as the last or current serving cell.

Example 29 is the machine-readable storage medium of Example 28 in which the preferentially selecting comprises, in response to the SLS procedure being unsuccessful, performing a Derived Band Search (DBS) procedure on the list of candidates.

Example 30 is the machine-readable storage medium of Example 29 in which the preferentially selecting comprises, in response to the DBS procedure being unsuccessful, performing a supplemental SLS procedure on another list of candidates which may not belong to the same RAN Notification Area as the last or current serving cell.

Example 31 is the machine-readable storage medium of Example 30 in which the preferentially selecting comprises, in response to the supplemental SLS procedure being unsuccessful, performing a supplemental DBS procedure on at least a portion of the list of candidates having an RNA ID that does not match that of the last or current serving cell.

Example 32 is the machine-readable storage medium of Example 31 in which the at least a portion of the list of candidates excludes candidates previously searched in the SLS procedure.

Example 33 is the machine-readable storage medium of Example 25 in which the preferentially selecting comprises determining a priority as a function of RNA ID and an absolute priority indicated in System Information or dedicated signaling priority.

Example 34 is the machine-readable storage medium of Example 25 in which the instructions further configure the processor to trigger a unified Random Access Channel (RACH) procedure for a mobile originated data transfer and an RNA update.

Example 35 is the machine-readable storage medium of Example 25 in which the instructions further configure the processor to reduce a System Information Block (SIB) priority of a coverage cell in RRC Inactive state before transitioning to an RRC_Connected state in a capacity cell.

Example 36 is the machine-readable storage medium of Example 25, in which the instructions further configure the processor to receive from a gNB a System Information Block (SIB) reselection priority for neighbor cells indicating reselection priority for RRC idle and reselection priority for RRC inactive.

Example 37 is a non-transitory machine-readable storage medium, the machine-readable storage medium including instructions that when executed by a processor of a User Equipment (UE), cause the UE in a Radio Resource Control (RRC) Inactive state to reduce Random Access Channel (RACH) transmissions for a Radio Access Network (RAN) Notification Area (RNA) update procedure and a mobile originated (MO) data transmission in response to an RRC triggered RNA update procedure by configuring the UE to:

in response to the RNA update procedure being triggered due to a cell change to an RNA that is different from that of a last or current serving cell, locally transition to RRC IDLE state and trigger an RRC connection establishment procedure indicating a connection establishment cause as MO data; and in response to the RNA update procedure being triggered due to an RNA timer expiry of a serving cell or another cell in the same RNA as the last or current serving cell, trigger an RRC resume request procedure with its cause being MO data.

Example 38 is the machine-readable storage medium of Example 37, in which the instructions further configure the UE to determine whether the MO data transmission will occur within a predetermined period Example 39 is the machine-readable storage medium of Example 38, in which the predetermined period is configurable.

Example 40 is the machine-readable storage medium of Example 38, in which the instructions further configure the UE to trigger the resume request procedure if the data transfer will occur within the predetermined period.

Example 41 is the method of Example 38, in which the instructions further configure the UE to trigger the RRC connection establishment procedure if the data transfer will occur within the predetermined period.

Example 42 is the method of Example 37, in which the instructions further configure the UE to receive a request to initiate the MO data transmission and combine in a single RACH the MO data transmission and the RNA update procedure.

Example 43 is a non-transitory machine-readable storage medium, the machine-readable storage medium including instructions that when executed by a processor of a User Equipment (UE), cause the UE to select a band or beam in a cellular system that improves Random Access Channel (RACH) efficiency by configuring the UE to:

determine for each member of a set of candidate band and/or beam a RACH efficiency parameter as a function of Max Tx and path loss; and select from the set a band or beam having a value of the RACH efficiency parameter exceeding that of any other member of the set.

Example 44 is the machine-readable storage medium of Example 43, in which the Max Tx parameter is received in a System Information Block (SIB).

Example 45 is the machine-readable storage medium of Example 43, in which the instructions further configure the UE to determine the path loss based on reference signal power information received in a System Information Block (SIB).

Example 46 is the computer-readable storage medium of Example 43, in which the instructions further configure the UE to determine the path loss based on Reference Signal Receive Power (RSRP) level.

Example 47 is the computer-readable storage medium of Example 43, in which the instructions further configure the UE to initiate the RACH on an antenna associated with the highest RACH efficiency parameter.

Example 48 is the computer-readable storage medium of Example 43, in which the instructions further configure the UE to modify a RACH efficiency parameter for a member of the set associated with a Radio Access Network (RAN) Notification Area (RNA) that is different from a serving cell of the UE.

Example IC may include an apparatus comprising means to perform one or more elements of a method described in or related to any of the above Examples, or any other method or process described herein.

Example 2C may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3C may include an apparatus comprising logic, modules, or circuitry to perform one or more elements of a method described in or related to any of the above Examples, or any other method or process described herein.

Example 4C may include a method, technique, or process as described in or related to any of the above Examples, or portions or parts thereof Example SC may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6C may include a signal as described in or related to any of the above Examples, or portions or parts thereof Example 7C may include a datagram, packet, frame, segment, protocol data unit (PDU), or message as described in or related to any of the above Examples, or portions or parts thereof, or otherwise described in the present disclosure.

Example 8C may include a signal encoded with data as described in or related to any of the above Examples, or portions or parts thereof, or otherwise described in the present disclosure.

Example 9C may include a signal encoded with a datagram, packet, frame, segment, PDU, or message as described in or related to any of the above Examples, or portions or parts thereof, or otherwise described in the present disclosure.

Example 10C may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11C may include a computer program comprising instructions, wherein execution of the program by a processing element is to cause the processing element to carry out the method, techniques, or process as described in or related to any of the above Examples, or portions thereof.

Example 12C may include a signal in a wireless network as shown and described herein.

Example 13C may include a method of communicating in a wireless network as shown and described herein.

Example 14C may include a system for providing wireless communication as shown and described herein.

Example 15C may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a User Equipment (UE) in a Radio Resource Control (RRC) Inactive state of reducing Random Access Channel (RACH) transmissions for a Radio Access Network (RAN) Notification Area (RNA) update procedure and a transmission of mobile originated (MO) data in response to an RRC triggered RNA update procedure, the method comprising:
   in response to the UE entering the RRC Inactive state, starting an RNA timer;
   in response to the RNA update procedure being triggered due to a first cell change of the UE from a first serving cell to a second serving cell in an RNA that is different from that of the first serving cell when a host application of the UE has the MO data ready to transmit and the RNA timer is still running, locally transitioning from the RRC Inactive state to an RRC Idle state and triggering an RRC connection establishment procedure indicating a connection establishment cause as the MO data; and
   in response to the RNA update procedure being triggered due to an expiry of the previously started RNA timer that is caused by the UE remaining in the first serving cell or by the UE having performed a second cell change of the UE to a third cell that is in a same RNA as the first serving cell when the host application of the UE has the MO data ready to transmit, triggering an RRC resume request procedure indicating a resume request cause as the MO data.

2. The method of claim 1, further comprising determining whether the transmission of the MO data is configured to otherwise occur within a predetermined period.

3. The method of claim 2, in which the predetermined period is configurable.

4. The method of claim 2, wherein the RRC resume request procedure indicating the resume request cause as the MO data is triggered in response to the determination that the transmission of the MO data transfer will is configured to otherwise occur within the predetermined period.

5. The method of claim 2, wherein the RRC connection establishment procedure indicating the connection establishment cause as the MO data is triggered in response to the determination that the transmission of the MO data is configured to otherwise occur within the predetermined period.

6. The method of claim 1, further comprising receiving a request to initiate the transmission of the MO data and combine the transmission of the MO data and the RNA update procedure in a single RACH.

7. A non-transitory machine-readable storage medium, the machine-readable storage medium including instructions that when executed by a processor of a User Equipment (UE), cause the UE in a Radio Resource Control (RRC) Inactive state to reduce Random Access Channel (RACH) transmissions for a Radio Access Network (RAN) Notification Area (RNA) update procedure and a transmission of mobile originated (MO) data in response to an RRC triggered RNA update procedure by configuring the UE to:
   in response to the UE entering the RRC Inactive state, starting an RNA timer;
   in response to the RNA update procedure being triggered due to a first cell change of the UE from a first serving cell to a second serving cell in an RNA that is different from that of the first serving cell when a host application of the UE has the MO data ready to transmit and the RNA timer is still running, locally transition from the RRC Inactive state to an RRC Idle state and trigger an RRC connection establishment procedure indicating a connection establishment cause as the MO data; and
   in response to the RNA update procedure being triggered due to an expiry of the previously started RNA timer that is caused by the UE remaining in the first serving cell or by the UE having performed a second cell change of the UE to a third cell that is in a same RNA as the first serving cell when a host application of the UE has the MO data ready to transmit, trigger an RRC resume request procedure indicating a resume request cause as the MO data.

8. The machine-readable storage medium of claim 7, in which the instructions further cause the UE to determine whether the transmission of the MO data is configured to otherwise occur within a predetermined period.

9. The machine-readable storage medium of claim 8, in which the predetermined period is configurable.

10. The machine-readable storage medium of claim 8, wherein the RRC resume request procedure indicating the resume request cause as the MO data is triggered in response to a determination that the transmission of the MO data will is configured to otherwise occur within the predetermined period.

11. The non-transitory machine-readable storage medium of claim 8, wherein the RRC connection establishment procedure indicating the connection establishment cause as the MO data is triggered in response to the determination that the transmission of the MO data is configured to otherwise occur within the predetermined period.

12. The non-transitory machine-readable storage medium of claim 7, in which the instructions further configure the UE to receive a request to initiate the transmission of the MO data and combine the transmission of the MO data and the RNA update procedure in a single RACH.

* * * * *